US012403411B2

(12) United States Patent
Kelly et al.

(10) Patent No.: US 12,403,411 B2
(45) Date of Patent: Sep. 2, 2025

(54) ANIMATED BUBBLE TOY CUSTOMIZABLE AND ACTIVATED BY THE ATTACHMENT OF AN ACCESSORY

(71) Applicant: LIGHTUPTOYS.COM, LLC, Sellersburg, IN (US)

(72) Inventors: Joshua C. Kelly, New Albany, IN (US); Christopher D. Kelly, New Albany, IN (US); Max Armendariz Lalama, Sellersburg, IN (US); Christopher W. Chung, Orlando, FL (US)

(73) Assignee: LIGHTUPTOYS.COM, LLC, Sellersburg, IN (US)

( * ) Notice: Subject to any disclaimer, the term of this patent is extended or adjusted under 35 U.S.C. 154(b) by 248 days.

(21) Appl. No.: 18/186,431

(22) Filed: Mar. 20, 2023

(65) Prior Publication Data

US 2023/0277954 A1 Sep. 7, 2023

Related U.S. Application Data

(63) Continuation-in-part of application No. 18/054,693, filed on Nov. 11, 2022, which is a (Continued)

(51) Int. Cl.

*A63H 33/28* (2006.01)
*A63H 30/04* (2006.01)

(Continued)

(52) U.S. Cl.

CPC ............. *A63H 33/28* (2013.01); *A63H 30/04* (2013.01); *A63H 33/22* (2013.01); *A63H 33/26* (2013.01); *F21V 33/008* (2013.01)

(58) Field of Classification Search

CPC ...................................................... A63H 33/26
See application file for complete search history.

(56) References Cited

U.S. PATENT DOCUMENTS 3,258,006 A 6/1966 Vishnevsky et al.
3,440,349 A * 4/1969 Gibbs ...................... G01H 3/00 446/337

(Continued)

FOREIGN PATENT DOCUMENTS

JP H04-124199 U 11/1992
JP 2003-325213 A 11/2003

(Continued)

OTHER PUBLICATIONS

English Translation of Official Communication Report dated Oct. 15, 2024 with respect to related Japanese application, JP 2023-190581.

*Primary Examiner* — Eugene L Kim
*Assistant Examiner* — Matthew B Stanczak
(74) *Attorney, Agent, or Firm* — Jessica C. Ronald; Scott R. Cox

(57) ABSTRACT

An illuminating animation device secured within the housing of a bubble producing toy. Animation is created by the illumination of LEDs, which are secured within chambers of the device and project through a film and onto an inside surface of the housing. A printed circuit board is secured within the device and is electrically connected to a microcontroller unit secured within the housing. One mode of activating the illuminating animation device is via the connection of a hat to the housing. The hat includes resisters that close a circuit between the toy and the hat. The microcontroller unit detects and recognizes the value of the resistors and transmits a correlating signal to various electronic components of the toy, which activates features associated with the resistance value.

14 Claims, 18 Drawing Sheets

Related U.S. Application Data continuation-in-part of application No. 17/335,447, filed on Jun. 1, 2021, now Pat. No. 12,097,447.

(60) Provisional application No. 63/269,724, filed on Mar. 22, 2022, provisional application No. 63/269,667, filed on Mar. 21, 2022, provisional application No. 63/269,654, filed on Mar. 21, 2022, provisional application No. 63/269,674, filed on Mar. 21, 2022, provisional application No. 63/263,994, filed on Nov. 12, 2021.

(51) Int. Cl.

| | |
|---|---|
| ***A63H 33/22*** | (2006.01) |
| ***A63H 33/26*** | (2006.01) |
| ***F21V 33/00*** | (2006.01) |

(56) References Cited

U.S. PATENT DOCUMENTS

| | | | | | |
|---|---|---|---|---|---|
| 4,072,314 | A * | 2/1978 | Rosen | A63H 33/00 446/485 |
| 4,107,462 | A * | 8/1978 | Asija | A63H 13/00 40/457 |
| 4,216,464 | A * | 8/1980 | Terry | A41F 9/002 340/321 |
| 4,521,205 | A * | 6/1985 | Spector | A63H 3/006 360/79 |
| D279,910 | S * | 7/1985 | Detro | D26/37 |
| 4,575,347 | A * | 3/1986 | Kitamura | A63H 3/28 446/348 |
| 4,642,710 | A * | 2/1987 | Murtha | G11B 25/063 40/448 |
| 4,823,240 | A * | 4/1989 | Shenker | A41D 27/08 362/108 |
| 4,926,296 | A * | 5/1990 | Blume | A45C 15/06 428/34.3 |
| 4,934,940 | A * | 6/1990 | Savery | G04B 45/0069 40/442 |
| 5,091,833 | A * | 2/1992 | Paniaguas | F21V 33/0028 428/17 |
| 5,458,525 | A * | 10/1995 | How | A63H 3/48 40/414 |
| 5,597,230 | A * | 1/1997 | Newman | A45C 15/06 362/184 |
| 5,782,698 | A * | 7/1998 | Keller | B44C 5/06 472/63 |
| 6,135,599 | A * | 10/2000 | Fang | A63H 33/30 353/98 |
| 6,652,349 | B1 * | 11/2003 | Wichter | A63H 13/00 446/353 |
| 6,789,932 | B2 * | 9/2004 | Healy | A45C 15/06 362/234 |
| 6,802,757 | B1 * | 10/2004 | Sejnowski | A63H 33/38 446/175 |
| 7,086,770 | B2 * | 8/2006 | Tell | G02B 6/0073 40/442 |
| 7,380,956 | B2 * | 6/2008 | Richmond | G03B 21/145 362/121 |
| 7,439,699 | B1 * | 10/2008 | Earnest | A63H 3/28 318/568.11 |
| 8,515,092 | B2 * | 8/2013 | Rucker | A63H 3/28 446/175 |
| 8,647,167 | B2 * | 2/2014 | Heilbron | A63H 13/005 446/337 |
| 8,714,799 | B2 * | 5/2014 | Chien | F21V 21/08 362/555 |
| 9,474,956 | B2 * | 10/2016 | Vu | G09B 5/125 |
| 9,557,037 | B1 * | 1/2017 | Gramelspacher | A63H 3/006 |
| 9,711,070 | B2 * | 7/2017 | Greene | G09F 13/08 |
| 9,759,413 | B2 * | 9/2017 | Lien | F21V 23/04 |
| 2003/0189825 | A1 * | 10/2003 | Tauch | B44C 5/005 362/800 |
| 2004/0067713 | A1 * | 4/2004 | Fong | A63H 3/006 446/175 |
| 2009/0190334 | A1 * | 7/2009 | Yang | F21S 8/035 362/124 |
| 2012/0052762 | A1 * | 3/2012 | Heller | A63H 33/22 446/147 |
| 2019/0111358 | A1 * | 4/2019 | Kelly | A63H 33/28 |
| 2019/0118110 | A1 | 4/2019 | Starling | |
| 2021/0379503 | A1 * | 12/2021 | Kelly | A63H 33/22 |
| 2022/0168662 | A1 * | 6/2022 | Kelly | A63J 5/028 |
| 2022/0379232 | A1 * | 12/2022 | Kelly | A63H 33/28 |
| 2023/0111031 | A1 * | 4/2023 | Kelly | A63H 33/22 446/219 |
| 2023/0253004 | A1 * | 8/2023 | Markovic | H04R 3/00 704/271 |
| 2023/0277953 | A1 * | 9/2023 | Kelly | A63H 33/22 446/15 |
| 2023/0277954 | A1 * | 9/2023 | Kelly | A63H 33/22 446/15 |
| 2024/0066424 | A1 * | 2/2024 | Kelly | A63H 33/28 |
| 2024/0149226 | A1 * | 5/2024 | Kelly | B01F 23/232 |
| 2024/0255121 | A1 * | 8/2024 | Johnson | A63H 33/006 |
| 2025/0001324 | A1 * | 1/2025 | Kelly | A63H 33/28 |

FOREIGN PATENT DOCUMENTS

| | | |
|---|---|---|
| JP | 2008-125718 A | 6/2008 |
| JP | 2008-259601 A | 10/2008 |

* cited by examiner

ANIMATED BUBBLE TOY CUSTOMIZABLE AND ACTIVATED BY THE ATTACHMENT OF AN ACCESSORY

CROSS-REFERENCES

This application claims benefit and priority from provisional application No. 63/269,667, filed on Mar. 21, 2022, provisional application No. 63/269,674, filed Mar. 21, 2022, and provisional application No. 63/269,654, filed Mar. 21, 2022, and is also a continuation-in-part application that claims the benefit of application Ser. No. 18/054,693, filed Nov. 11, 2022, which claimed the benefit and priority of provisional application No. 63/263,994, filed Nov. 12, 2021 and provisional application No. 63/269,724, filed Mar. 22, 2022, and was also filed as a continuation-in-part claiming benefit from patent application Ser. No. 17/335,447, filed Jun. 1, 2021. The entire contents of the above applications are incorporated herein by reference.

FIELD OF INVENTION

The invention relates to a device that illuminates through a film to produce an animation. More specifically, the device is secured within a bubble toy and is activated via the connection of an accessory to the toy.

BACKGROUND OF THE INVENTION

Toys exist that use light emitting diodes ("LEDs") located within various chambers to produce an animation or animated image. However, these toys fail as they do not produce a clear animation image that is easily viewable at varying distances. Moreover, when the image is projected onto another surface, it is distorted and not legible.

Moreover, toys that illuminate in synchronization with a song or sound exist. However, these toys are limited in use as the synchronization is preprogrammed, so the animated feature of the toy is programmed with only one preprogrammed sound. Further, these known toys are not activated via ambient sound and interactive.

Furthermore, while bubble producing toys exist, these toys do not have the capability of transforming into a customizable animated character with affixable accessories. Further, these existing toys do not produce an animated image resulting from the attachment of an accessory. For example, these known devices do not have a method of securing an accessory thereto, which activates various features of the toy, while still allowing bubbles to be emitted out of the toy.

SUMMARY OF THE INVENTION

An illuminating animation device secured within the housing of a bubble producing toy. Animation is created by the illumination of LEDs, which are secured within chambers of the device and project through a film and onto an inside surface of the housing. A printed circuit board is secured within the device and is electrically connected to a microcontroller unit secured within the housing. One mode of activating the illuminating animation device is via the connection of a hat to the housing. The hat includes resisters that close a circuit between the toy and the hat. The microcontroller unit detects and recognizes the value of the resistors and transmits a correlating signal to various electronic components of the toy, which activates features associated with the resistance value.

DETAILED DESCRIPTION

FIGS. 1-4 show an illuminating animation device 10 that is securable within a bubble producing toy 100, as shown in FIGS. 4-10 and 12-18. FIG. 11 shows a schematic diagram of a circuit that is closed when a hat 140 is connected to a housing 130 of the toy, thereby activating the illuminating animation device. The illuminating animation device is like that made by Applicant and disclosed in U.S. patent application Ser. No. 18/054,693 and the bubble toy is like the bubble wand, which is made by Applicant and is disclosed in U.S. patent application Ser. No. 17/335,447, which applications are incorporated by reference herein in their entirety.

Figure 1:
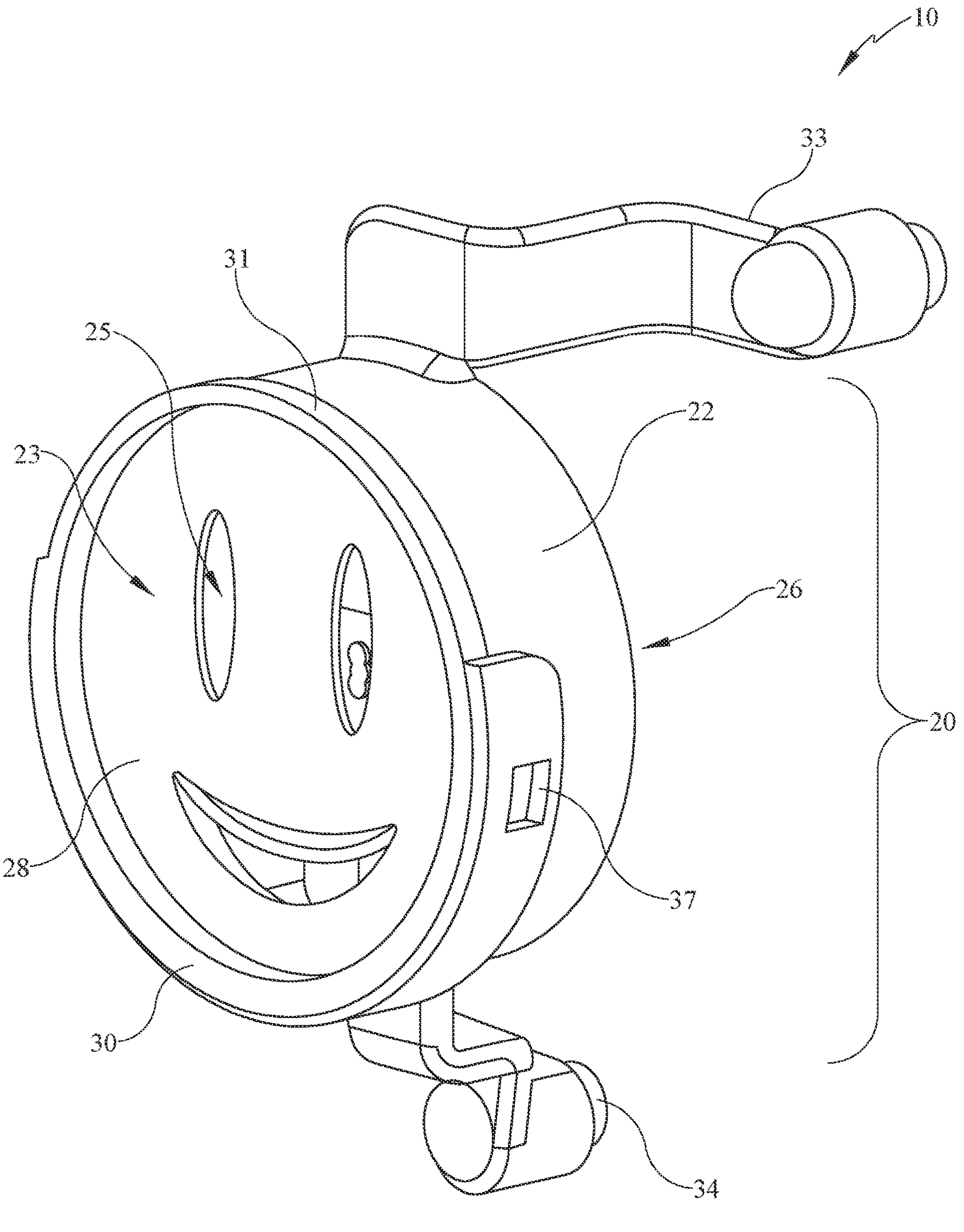
FIG. 1 is a side, perspective view of an illuminating animation device.
Figure 2:
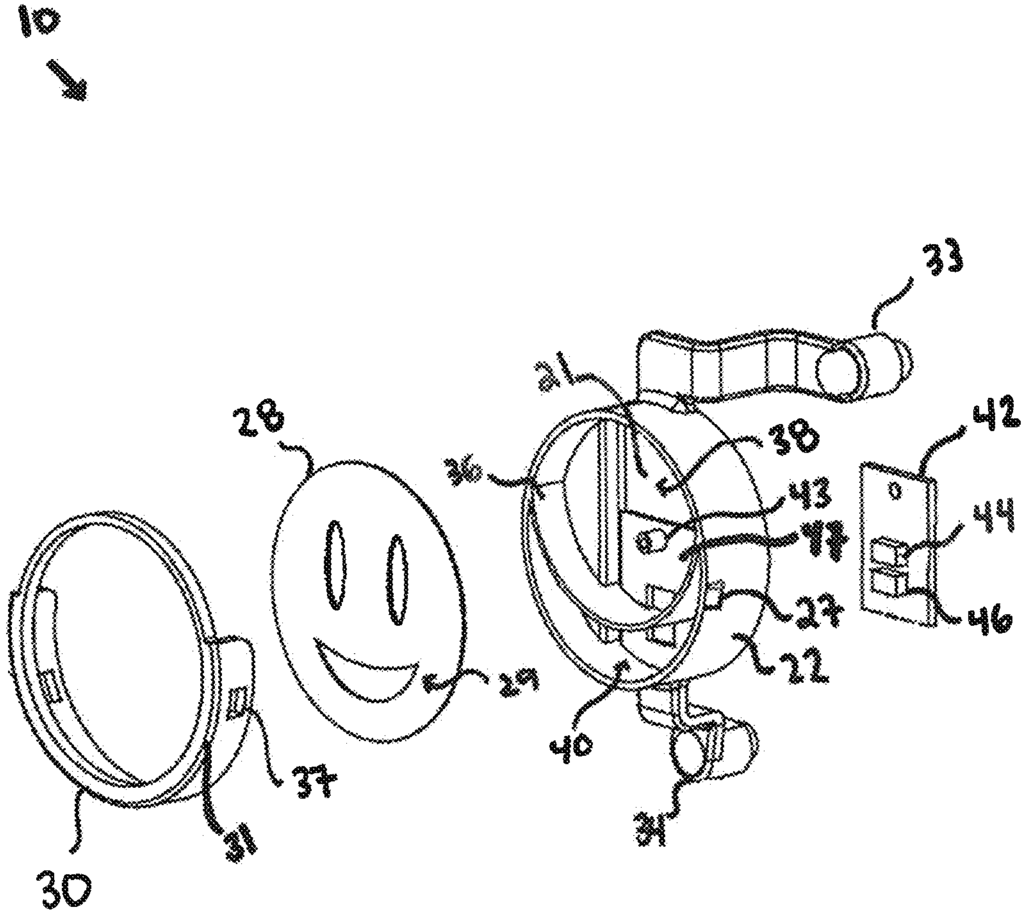
FIG. 2 is a side, perspective exploded view of the illuminating animation device shown in FIG. 1.
Figure 3:
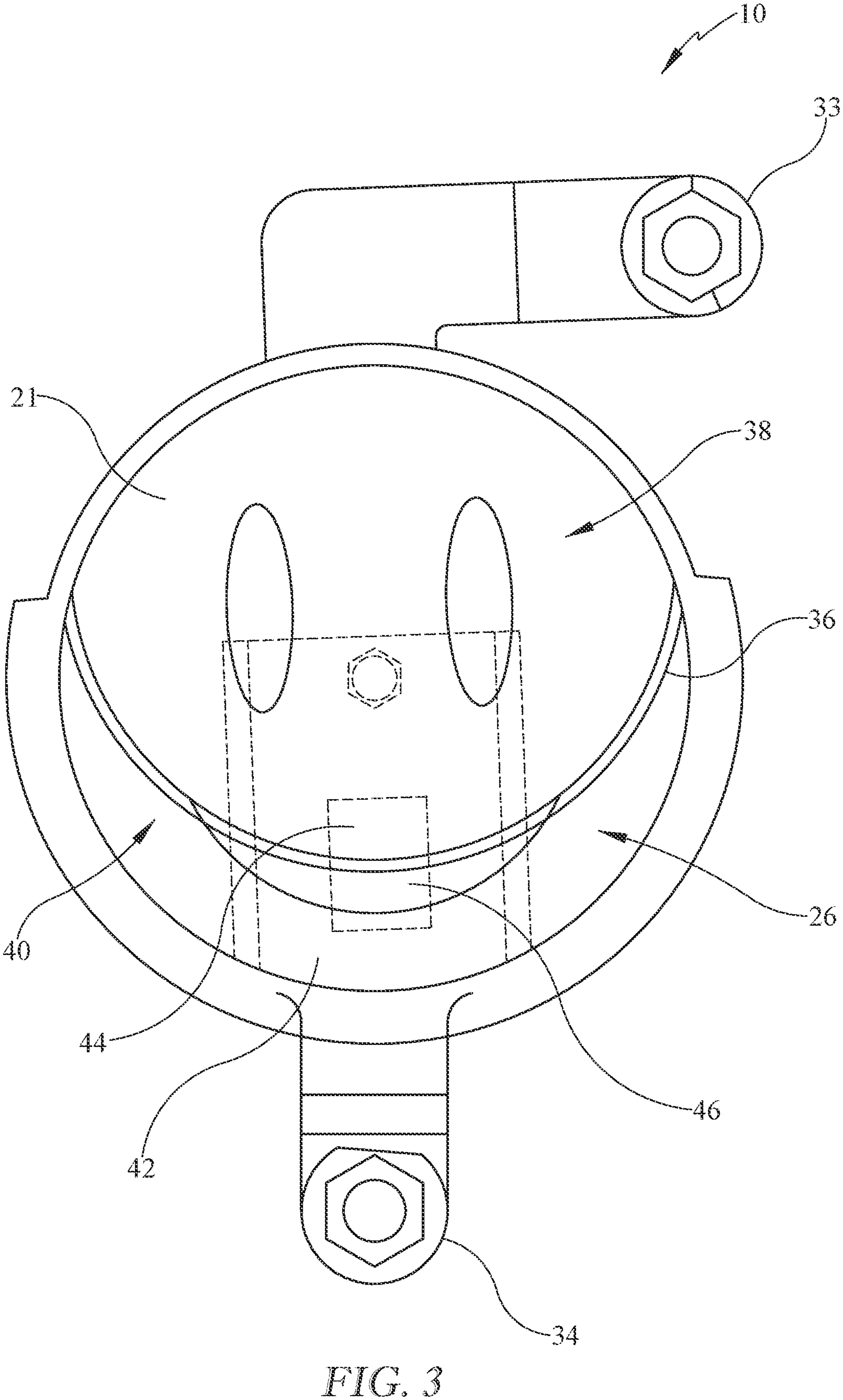
FIG. 3 is a back, transparent view of the illuminating animation device shown in FIG. 1.

As shown in FIGS. 1-3, the illumination animation device 10 includes a cylindrically shaped enclosure 20, which includes a cylindrically shaped cover 30 secured to a front face 23 thereof and a cylindrically shaped base 21 secured to a back face 26 thereof. In between the cover and the base is a cylindrically shaped wall 22 that extends from the base to the cover. The extension of the wall between the two faces forms an enclosure compartment 25 where various internal components of the device are secured. The cylindrically shaped cover includes a slot 31 into which a film 28 secures.

As shown in FIGS. 1-3, 8-9 and 12, a way in which the device 10 secures into the housing 130 of the toy 100, is via a bracketing system that includes either or both an upper 33 and lower bracket 34. These brackets are secured or soldered to an outside surface of a wall 22 of the device. The brackets are securable by any suitable methods, for example, via screws or glue.

As shown in FIGS. 1-3, particularly FIG. 2, the device 10 includes the cover 30, which secures around the front face 23 of the device to the wall 22. As shown in FIGS. 1-2, the cover includes notches 37, which correspond with clasps 27 that form a part of the wall, so the cover easily snaps onto the wall. The cover includes a slot 31 into which the film 28 snuggly fits. For example, as shown in FIG. 2, the cover is generally open so when the film is positioned into the slot, the film encompasses the central opening of the cover. Advantageously, the film is tightly secured within the cover so when the device is flipped upside down, the film does not slide out. Further, the film is easily removeable and interchangeable with different films with different images. The film is, for example, an opaque black with a matte finish acetate sheet with an image die cut onto the film. In this embodiment, the film includes a first image 29 carved therein, which is a smiley face with two eyes and a mouth. Any image can be carved or cut into this film depending on user specification. Further, if desired, the film forms the outermost portion of the front face and includes a securing mechanism to connect to the wall.

As shown in FIGS. 1-3, particularly FIG. 2, the wall 22 extends from the base 21 to the cover 30 and forms an enclosure compartment 25 where various internal components are secured. The enclosure compartment is divided into a first chamber 38 and a second chamber 40 via a chamber divider 36. The divider is secured or soldered onto two opposing inside surfaces of the wall. As the first image 29 is a smiley face, the divider is curved to correspond with the u-shape of the mouth. The divider is advantageously located so that any image containing a mouth will benefit from the desired talking animation effect. The number of chambers varies depending on the image that is etched into the film 28, the size of the device 10 and/or the desired animation effect. As shown in FIG. 3, the film is secured adjacent to the first chamber and second chamber so that the eyes and an upper portion of the mouth are aligned within the first chamber and a lower portion of the mouth is aligned within the second chamber. This specific positioning of the image adjacent to the first and second chambers aids in producing the desired talking animation effect of the image.

As shown in FIGS. 2-3, the first chamber 38 has a first LED 44 secured therein and the second chamber 40 has a second LED 46 secured therein. The LEDs are one color and/or vary in color and/or luminosity. The number of LEDs varies depending on factors such as the number of chambers present in the enclosure 20, the image carved into the film 28 and the desired animation effect. Both LEDs are secured and electrically connected to a printed circuit board ("PCB") 42, which PCB is secured within the back face 26 of the enclosure, for example via screws 43. As shown in FIG. 2, the base 21 of the device is manufactured to include a compartment 47 into which the PCB and LEDs secure. The LEDS are secured to the PCB using surface mounting technology. Advantageously, the inventors discovered the precise distance to situate the first and second LEDs from the film so that a clear animation image is produced regardless of whether it is being projected onto another surface. Specifically, the distance of the LEDs from the film is important in controlling the size and location of the image that is projected through the film to produce a clear, readable image. The distance of the LEDs from the film is from about 5 mm to about 15 mm and creates a crisp, precise animated image that is easily recognizable to the eye.

Figure 4:
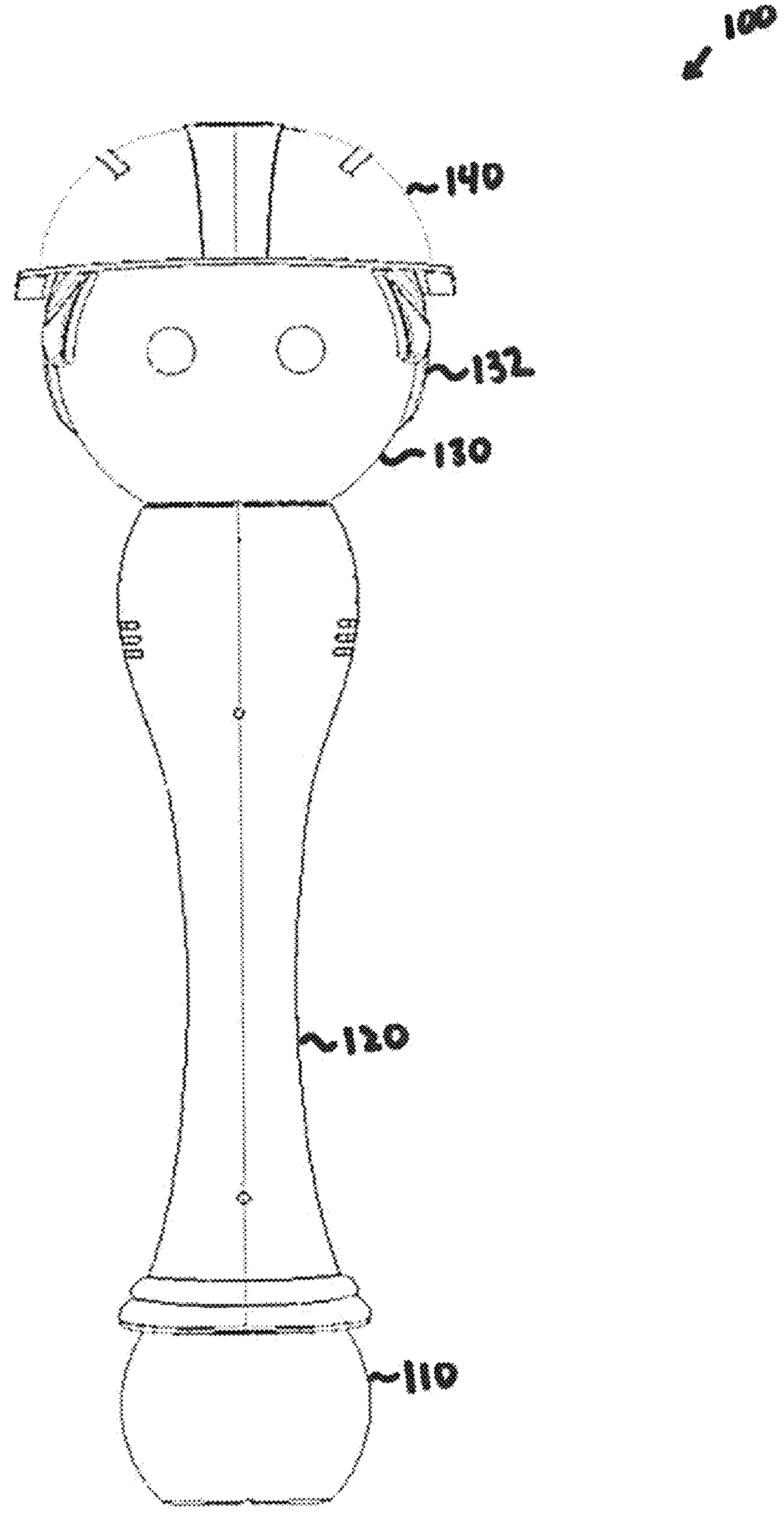
FIG. 4 is a front view of a bubble toy with a solution reservoir connected to a housing via a shaft, wherein a hat is affixed to the housing and the housing contains the illumination animation device shown in FIG. 1.
Figure 5:
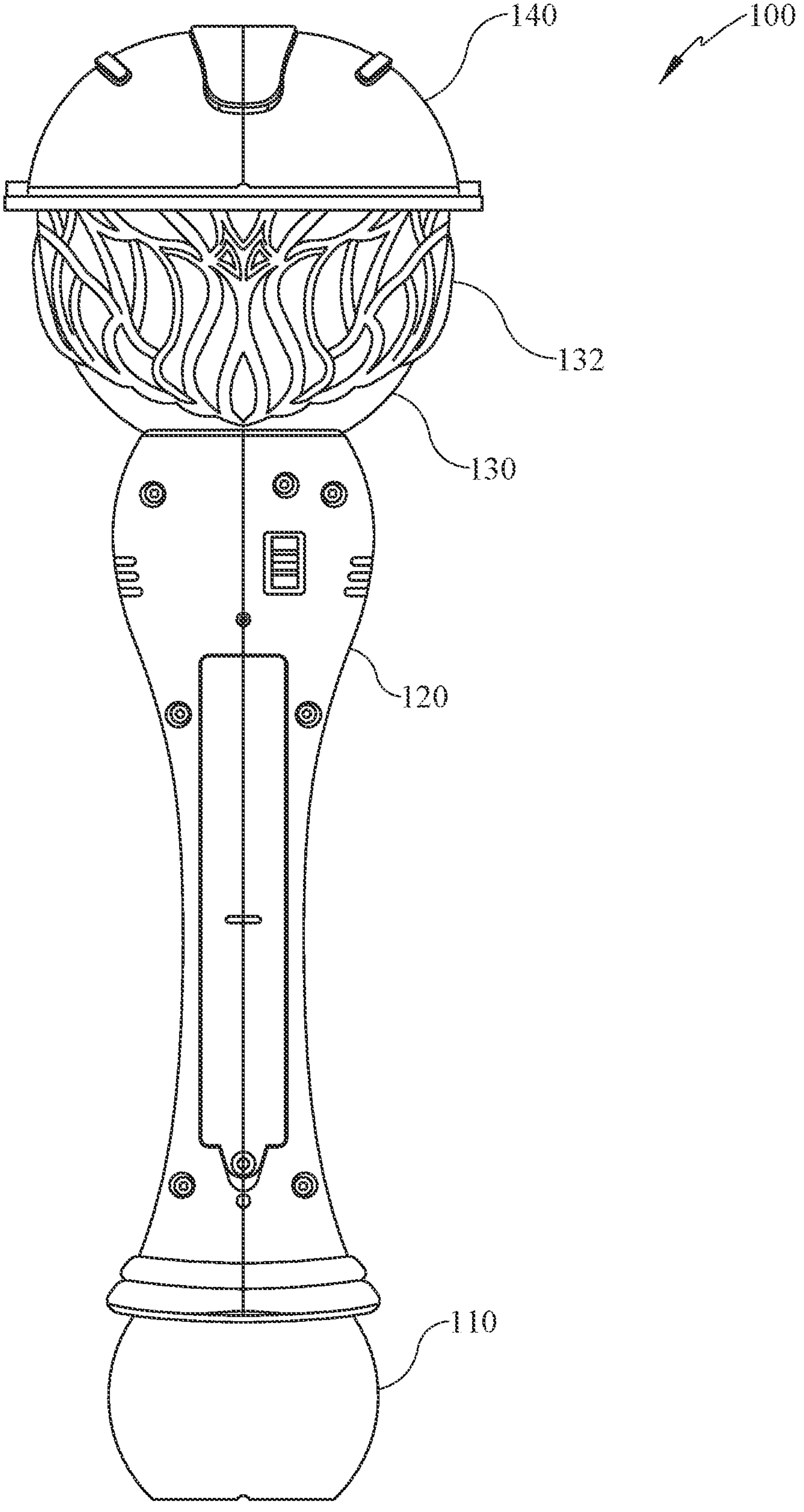
FIG. 5 is a back view of a bubble toy shown in FIG. 4.
Figure 6:
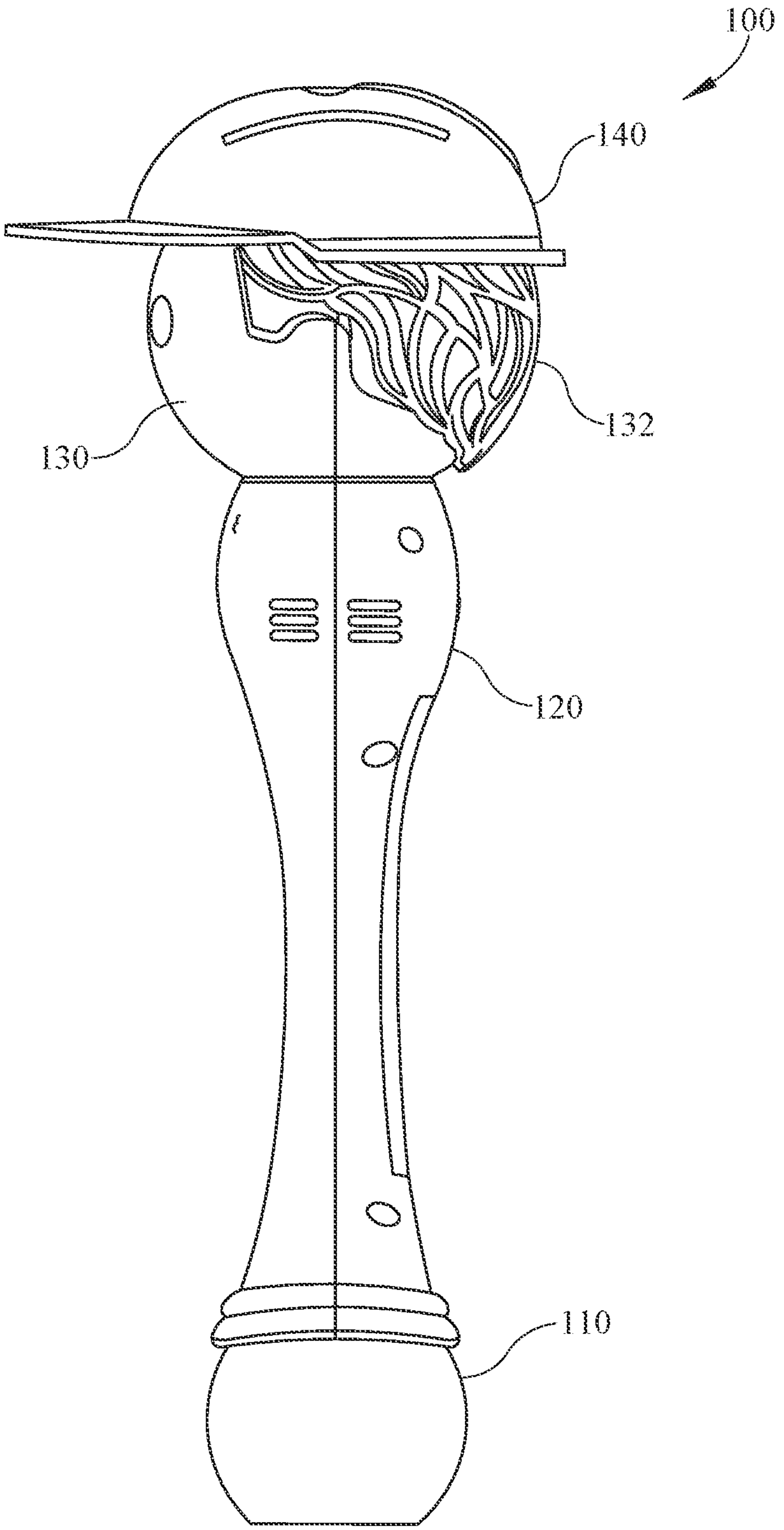
FIG. 6 is a side view of a bubble toy shown in FIG. 4.
Figure 7:
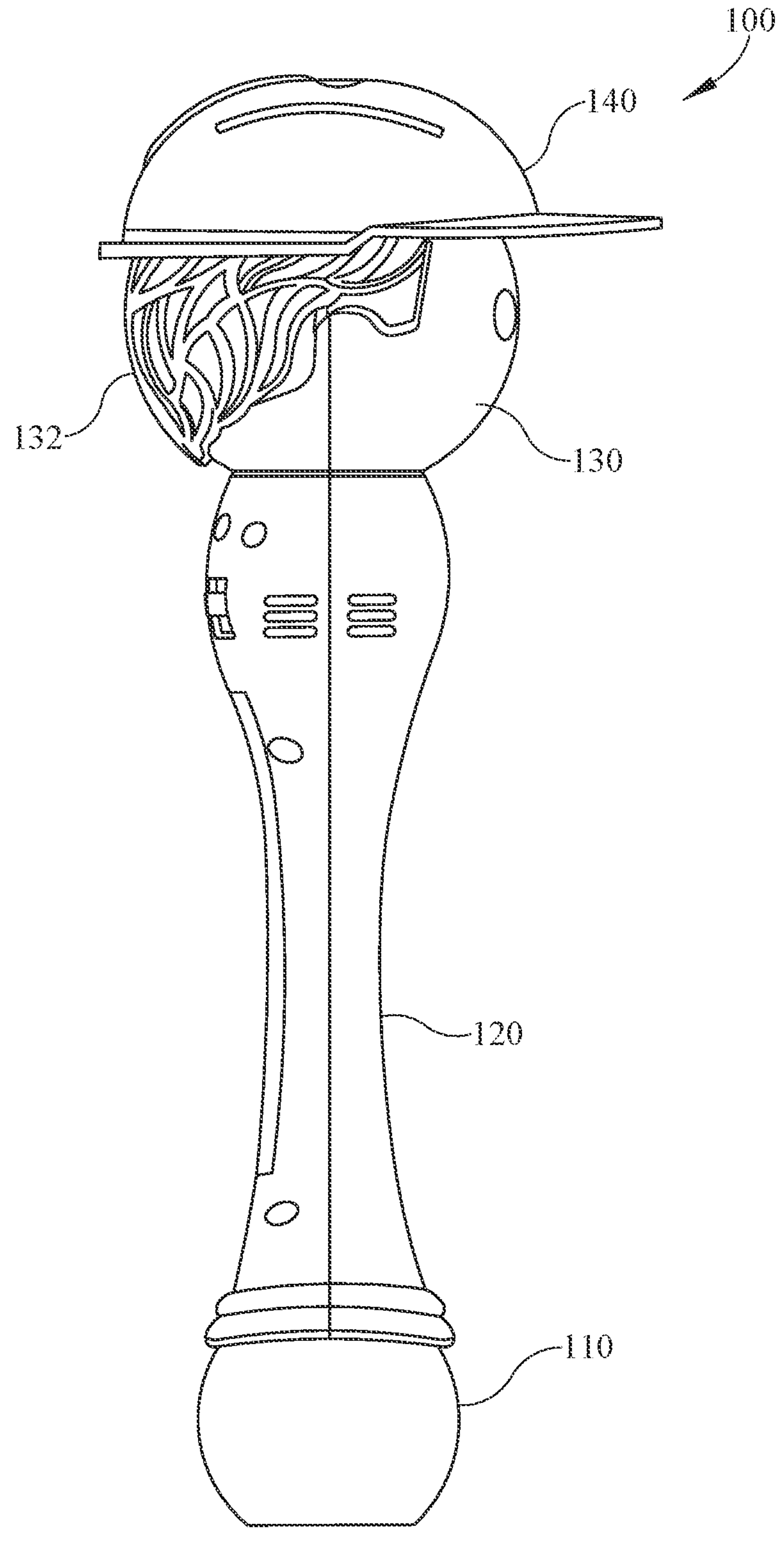
FIG. 7 is another side view of a bubble toy shown in FIG. 4.
Figure 8:
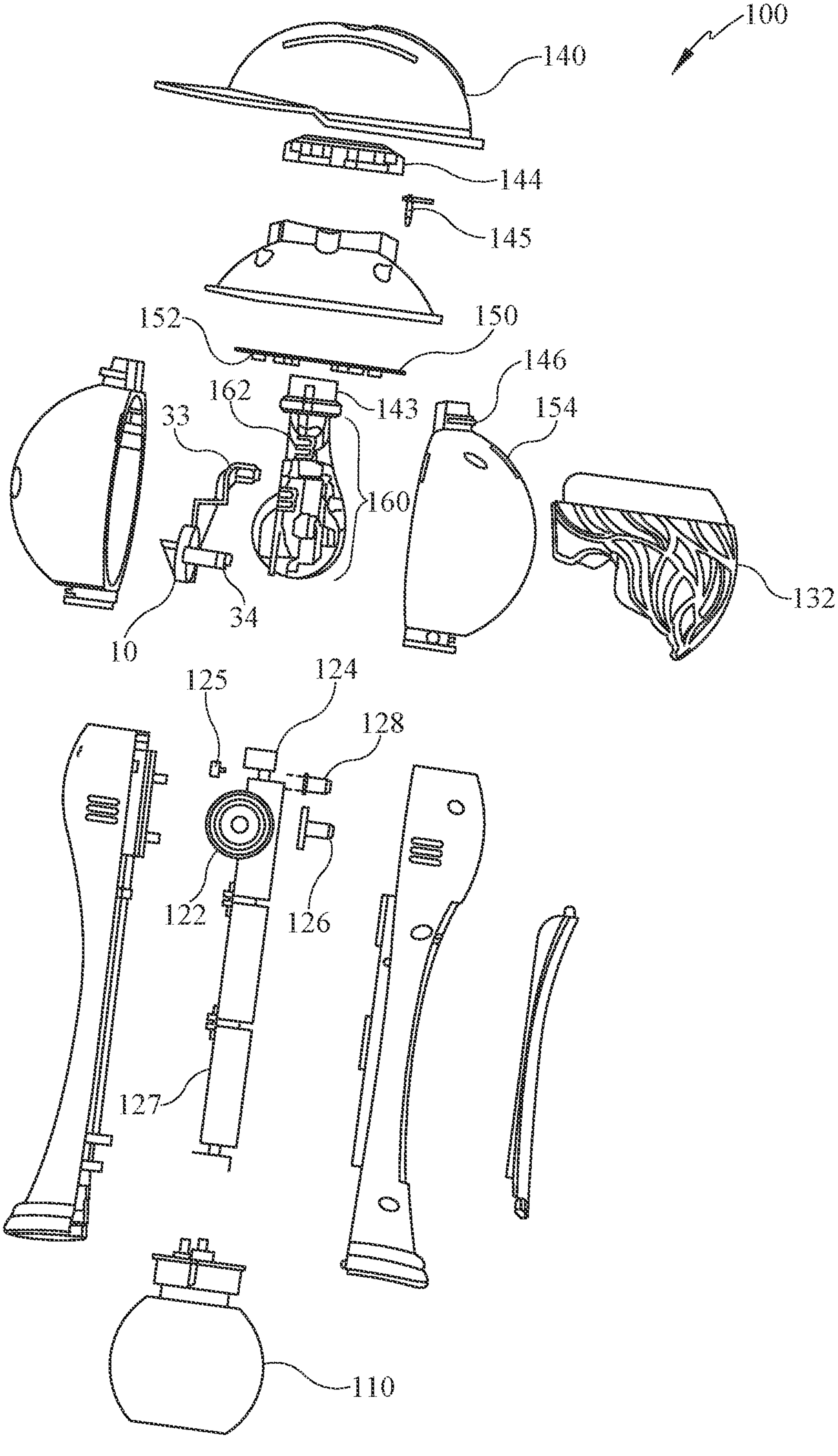
FIG. 8 is an exploded side view of the bubble toy shown in FIG. 4.
Figure 9:
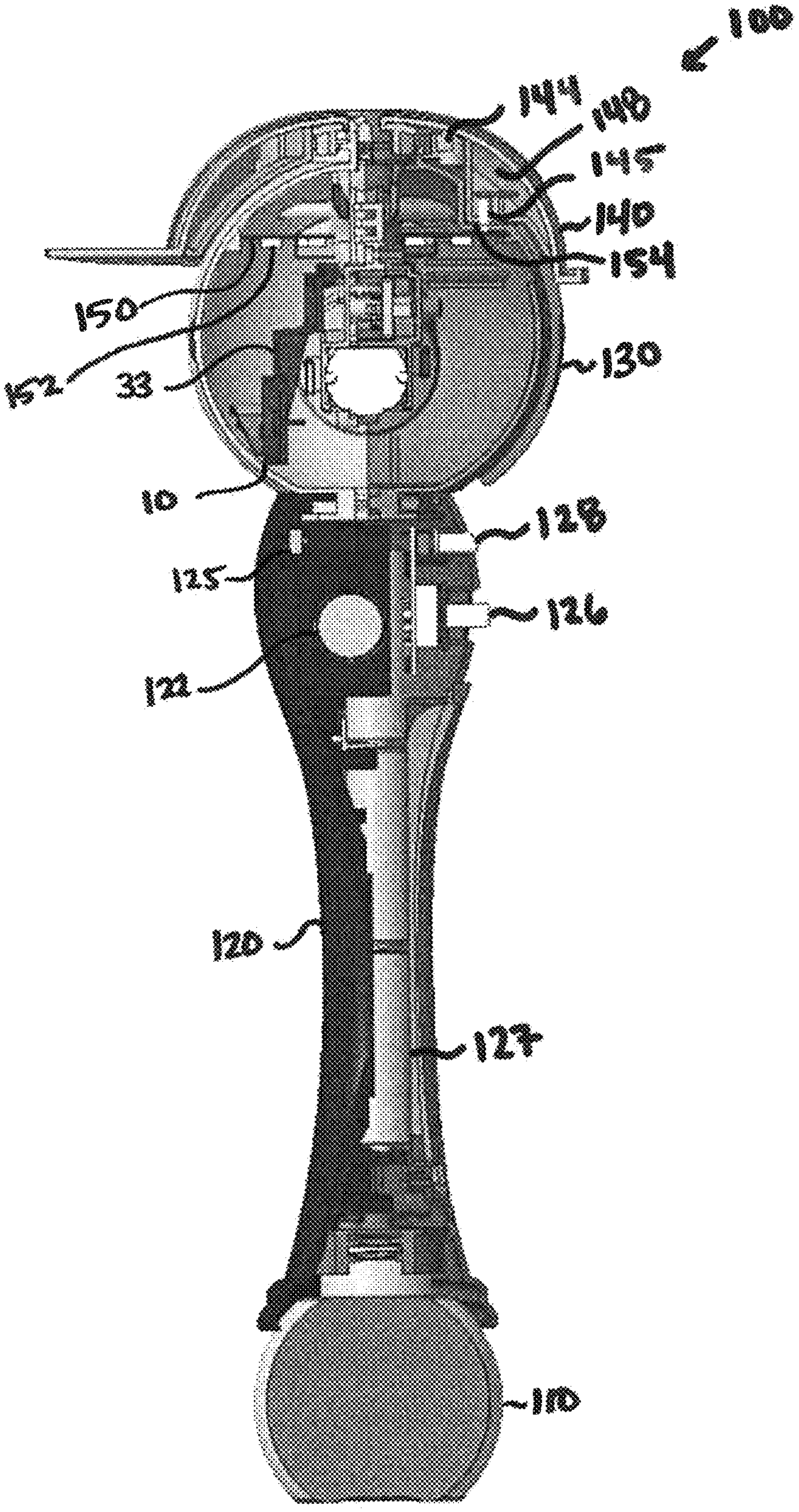
FIG. 9 is a cross-section side view of the bubble toy shown in FIG. 4.
Figure 12:
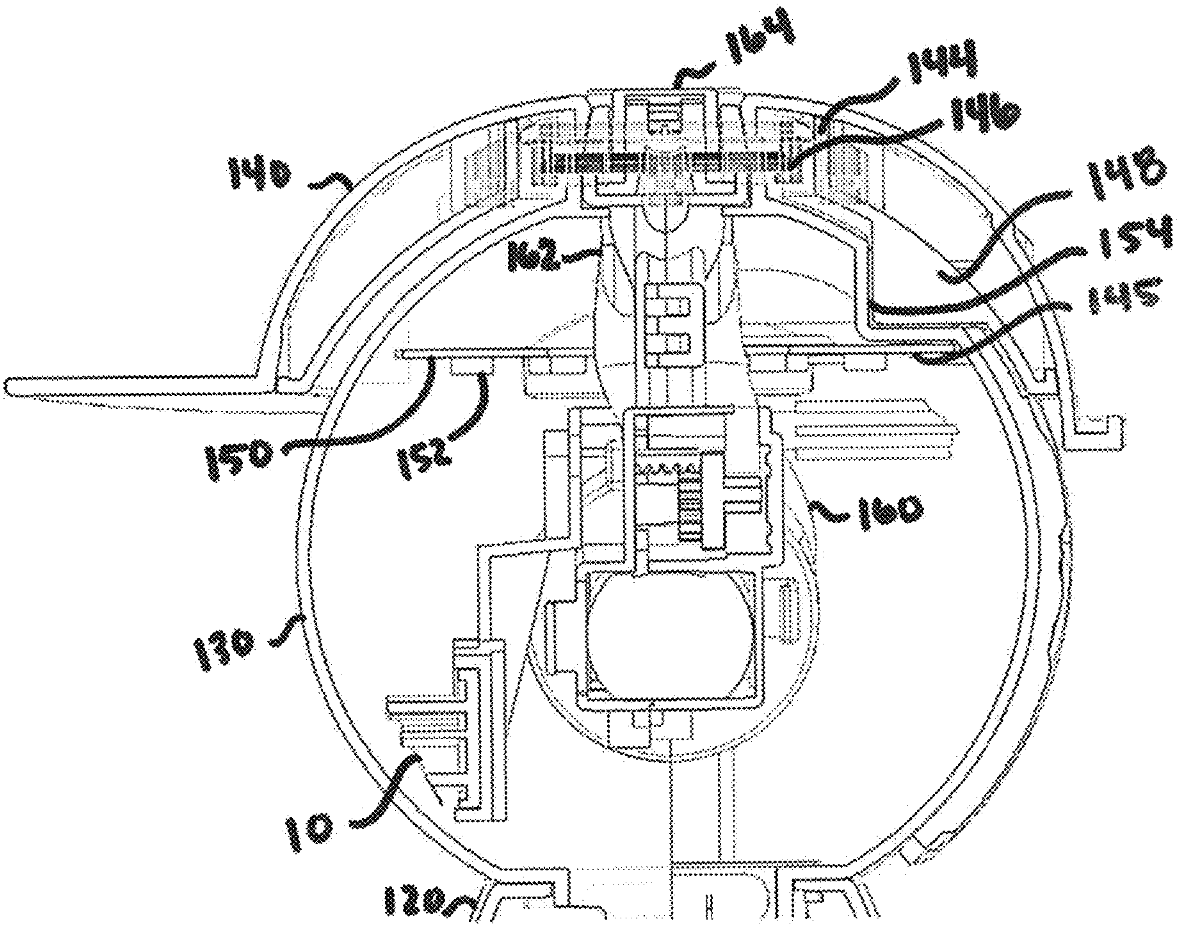
FIG. 12 is an open, side view of the hat connected to the housing of the toy shown in FIG. 4.

However, this distance varies depending on the toy into which the device is secured, the size of the device, the number of LEDs, and the image that is etched into the film. For example, when the device 10 is secured within the housing 130 of the bubble toy 100 such as shown in FIGS. 8-9 and 12, the image cut in the film 28 magnifies when illuminated onto an inside surface of the housing. Advantageously, the image 29 projected through the device is refracted onto the inside surface of the housing and therefore appears larger than the size of the film. Accordingly, the device is located at the precise distance from the inside surface of the housing, so the face projected thereon appears much larger through the front face of the housing, while also being legible. The housing is the precise opacity that the light refracts through the housing and is clearly visible. For example, as shown in FIGS. 4 and 6-7, a front face of the housing includes the silhouette, or a face or eyes etched therein to depict a character. Accordingly, the first LED 44 secured within the first chamber 38 is constantly illuminated when activated to continuously illuminate the eyes and upper portion of the mouth of the character. The second LED 46 within the second chamber 40 illuminates in synchronization with a song or sound that is played, so the lower portion of the mouth appears to be speaking. Accordingly, when the face is projected through the film onto the silhouette, the animated image is magnified and aligns perfectly with the silhouette.

As shown in FIGS. 8-9 and 12, the illuminating animation device 10 is secured within the housing 130 of a bubble producing toy 100. As shown in FIGS. 4-9, the bubble producing toy includes a bubble producing solution reservoir 110 that is connected to the housing via a shaft 120. A shown in FIGS. 4-9 and 12-18, connectable atop the housing is a hat 140 or anther accessory. Further, to make the character more versatile and lifelike, hair 132 or other accessories, are snapped onto the back of the housing. When the illuminating animation device is activated and projects an image onto the inside surface of the front face of the housing, the bubble toy comes alive as a unique bubble toy character.

Figure 10:
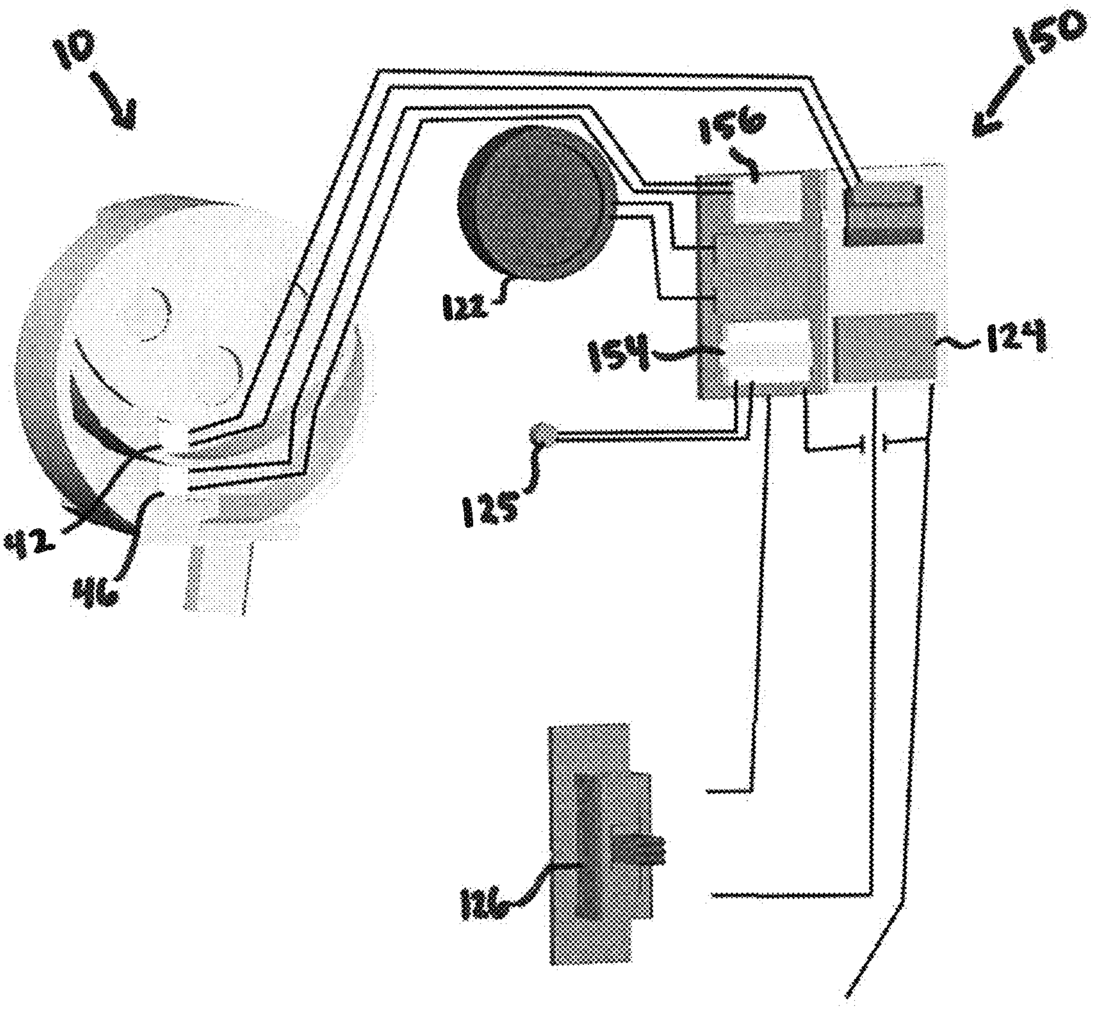
FIG. 10 is a view of the illuminating animation device shown in FIG. 1 electrically connected to a microcontroller unit.
Figure 11:
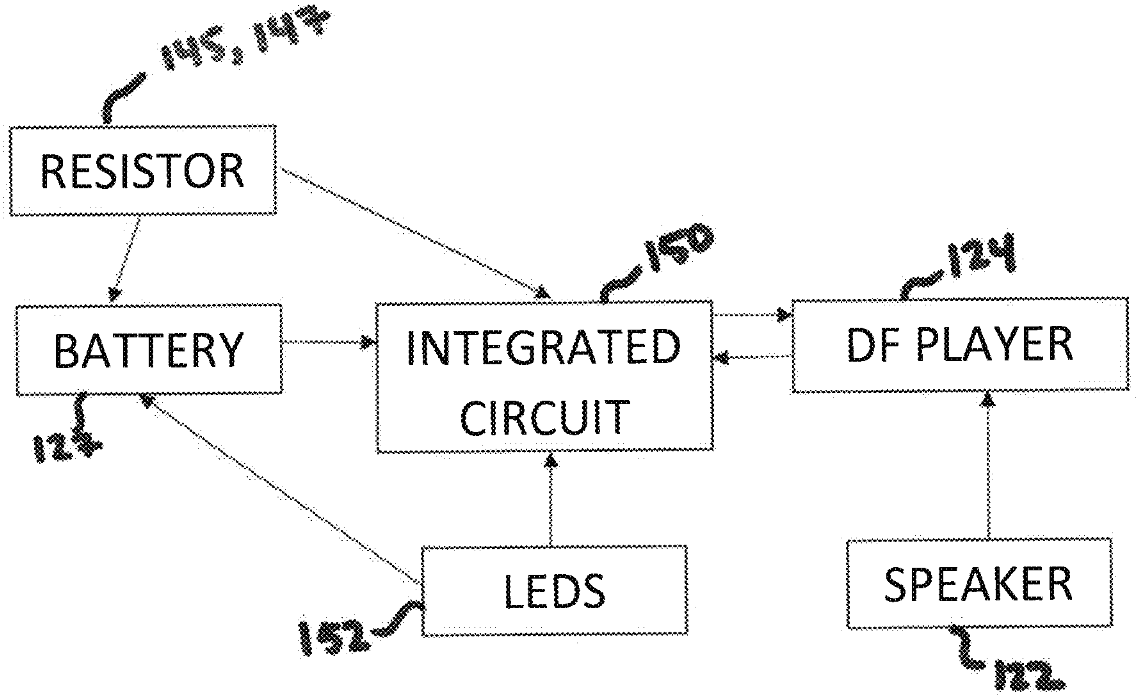
FIG. 11 is a block diagram of the circuit that is closed when the hat is connected to the housing of the toy shown in FIG. 4.

As shown in FIG. 10-11, the printed circuit board 42 of the device 10 is electrically connected to a microcontroller unit 150, such as an integrated circuit, which is secured within the housing 130 of the toy 100. As shown in FIGS. 8-9 and 12-13, the microcontroller unit is secured in a top portion of the housing around an air duct 162 of a bubble engine 160. The microcontroller unit includes circuitry, which is necessary for the control and activation of the illuminating animation device and other unique features of the toy, such as bubble production, activation of a microphone 125, emission of sound through a speaker 122, and illumination of LEDs 152.

As shown in FIGS. 8-11, secured within the shaft 120 is a speaker 122, which is electrically connected to a DF player 124, see FIG. 11. The DF player is preprogrammed with various songs, stories and sounds, for instance on an SD card, prior to securement in the shaft. The DF player is electrically connected to the microcontroller unit 150, which microcontroller unit transmits signals to the DF player depending on the mode that the toy is in. Modes of the toy are activated by a slide switch 126 or push button 128 secured within the shaft. Differing sounds are transmitted from the DF player to the speaker depending on the mode. Further secured within the shaft is a microphone 125, which is electrically connected to the slide switch and the microcontroller unit. When the microphone is activated via the slide switch, the toy is in an interactive mode. In interactive mode, the first 44 and second LED 46 of the illuminating animation device are sound activated via ambient sound detected by the microphone.

As shown in FIGS. 8-9, further secured within the shaft 120 are batteries 127, which power the toy 100. These batteries are electrically connected to the slide switch 126 and the push button 128, which buttons define modes of the toy. For example, when a user presses the push button a preprogrammed song, sound and/or story stored in the DF player 124 begins playing through the speaker 122. The illumination of the first and second LEDs (42, 46) within the illuminating animation device are programmed to illuminate in synchronization with this sound, so the mouth appears to be signing or talking.

Another mode of the toy 100 is activated when the user slides the slide switch 126 down. In this mode, the other LEDs 152 that are located within the housing 130 are activated and the illuminating animation device 10 is activated. Moreover, this mode is interactive, meaning that the first and second LEDs (42, 46) located within the animation device illuminate in synchronization with sound detected by the microphone 125. As shown in FIG. 10, the microphone is electrically connected to a receiver 154, which detects sound via the microphone. The receiver detects the sound and transmits this signal to the PCB 42 via a relay 156. The first and second LED illuminate in synchronization with the sound detected through the microphone. For example, when the user talks, the illuminating animation device illuminates in synchronization with the user's voice so that the character appears to be talking the words that the user is speaking. Furthermore, the LEDs illuminate in a unique way to create an aesthetically pleasing light show. For example, the LEDs vary in intensity, color temperature, color, illumination duration and timing. So, the light patterns of the LEDs are random or regular, or they are controlled in continuous sequence or pattern, a custom sequence or pattern, and/or sequence or pattern that incorporates constant timing, variable timing, and/or dimming based on the various mode of the toy.

Another mode of the toy 100 is activated when a user slides the slide switch 126 up. In this mode, the bubble engine is activated, and the toy produces bubbles through the bubble discharge orifice 164 located in a top portion of the housing 130. The bubble engine and correlating elements of the toy necessary to create bubbles are like those used in the bubble producing toy, or bubble wand, which is made by Applicant and is disclosed in U.S. patent application Ser. No. 17/335,447, which application is incorporated by reference herein in its entirety. In addition, in this mode, the LEDs 152 illuminate in a unique pattern. Furthermore, in this mode, the illuminating animation device 10 is activated via the connection of a hat 140 to the housing 130. The connection of the hat closes a circuit between the hat and the housing, which activates various features of the toy, see diagram of closed circuit in FIG. 11.

As shown in FIGS. 8-9, 12-13, and 17, the hat 140 is connected to the housing 130 via a snap ring 144 that is secured to an inside surface of the hat, for example via glue or screws. This snap ring snaps onto a mated flange 146, which is secured around a bubble discharge nozzle 143 of the housing. The hat snap fits onto this flange via the snap ring and is easily removeable with slight upward force.

Figure 13:
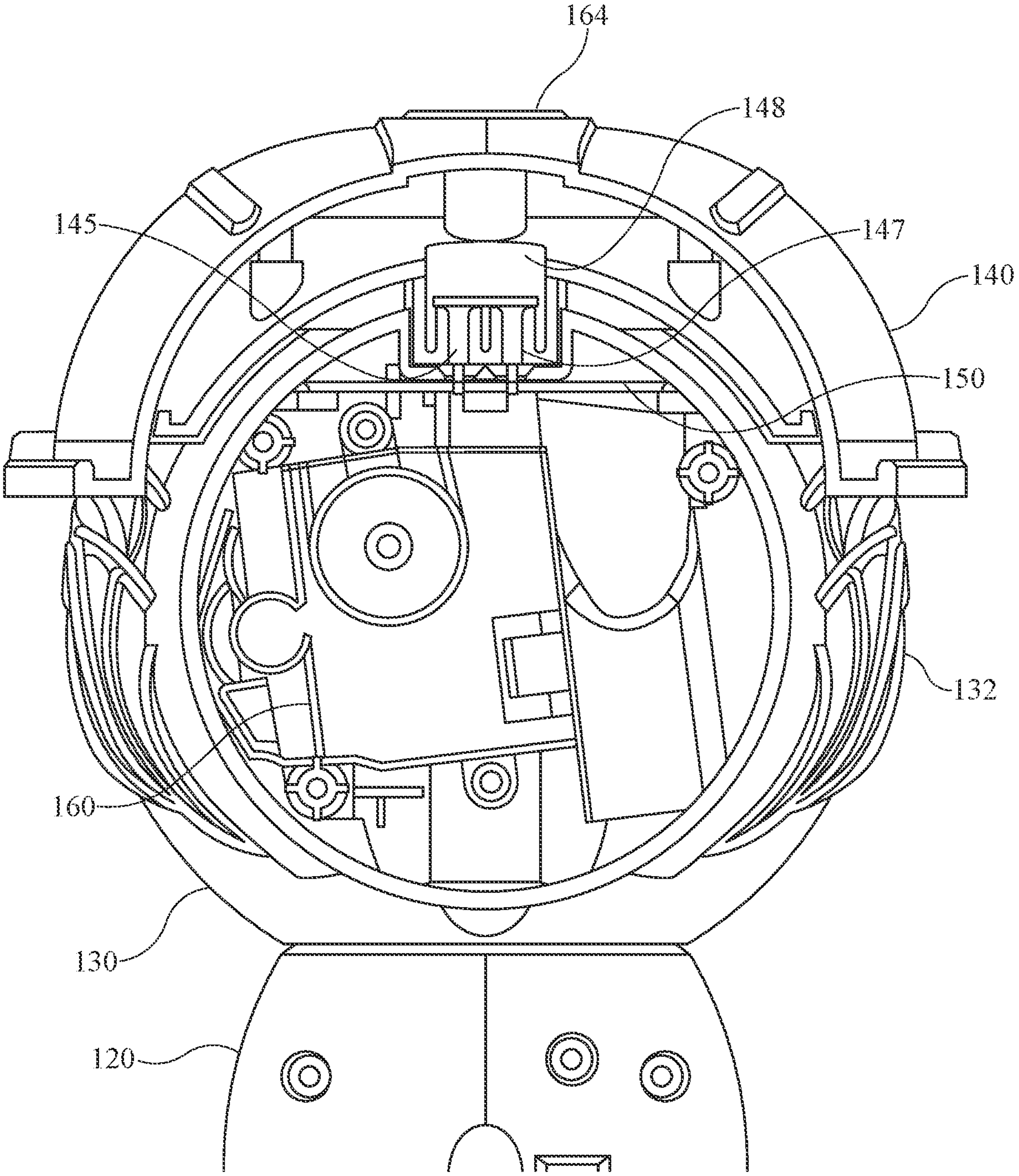
FIG. 13 is open, back view of the hat connected to the housing of the toy shown in FIG. 4.
Figure 14:
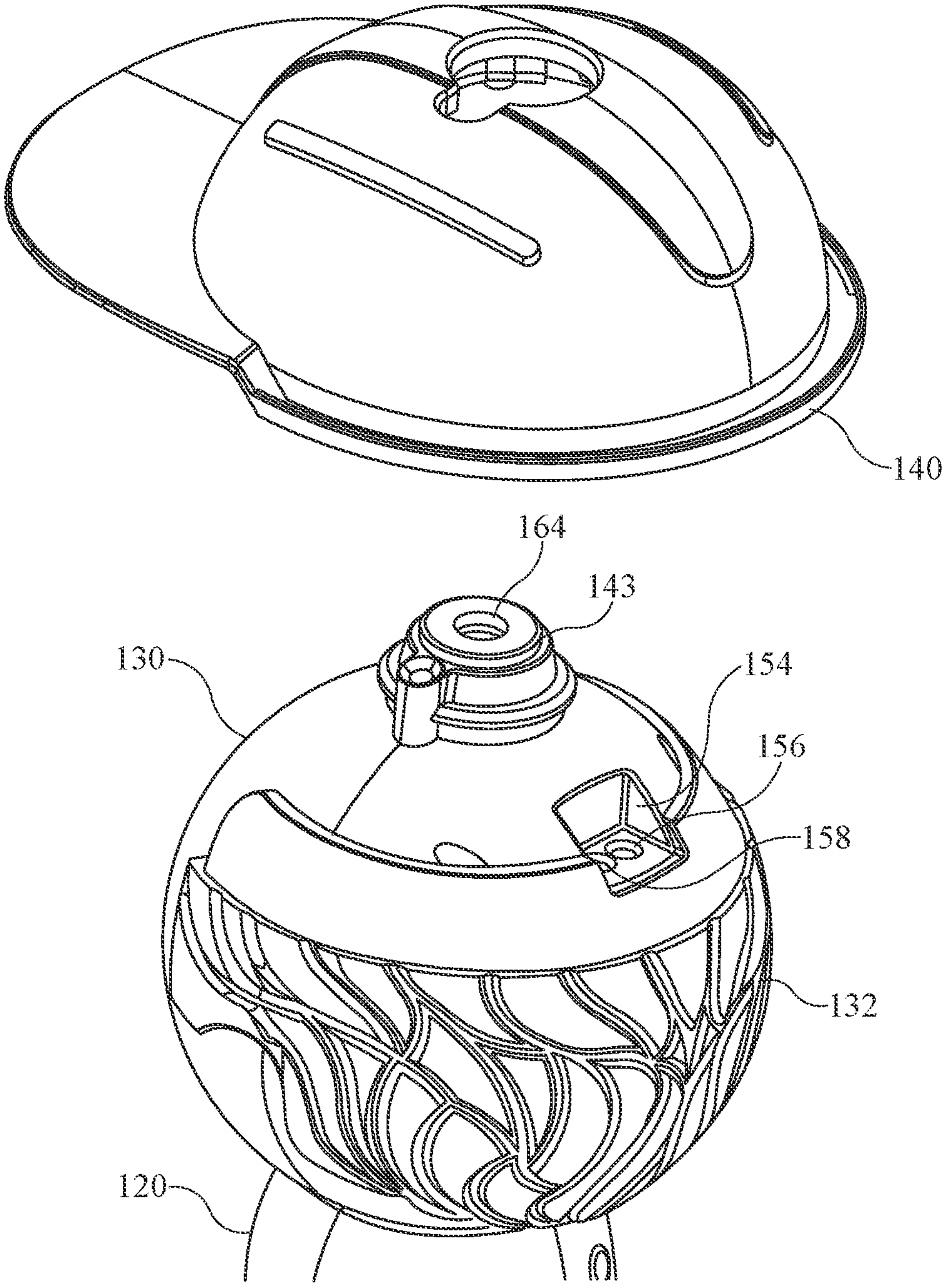
FIG. 14 is top, perspective view of the hat removed from the housing of the toy shown in FIG. 4.
Figure 15:
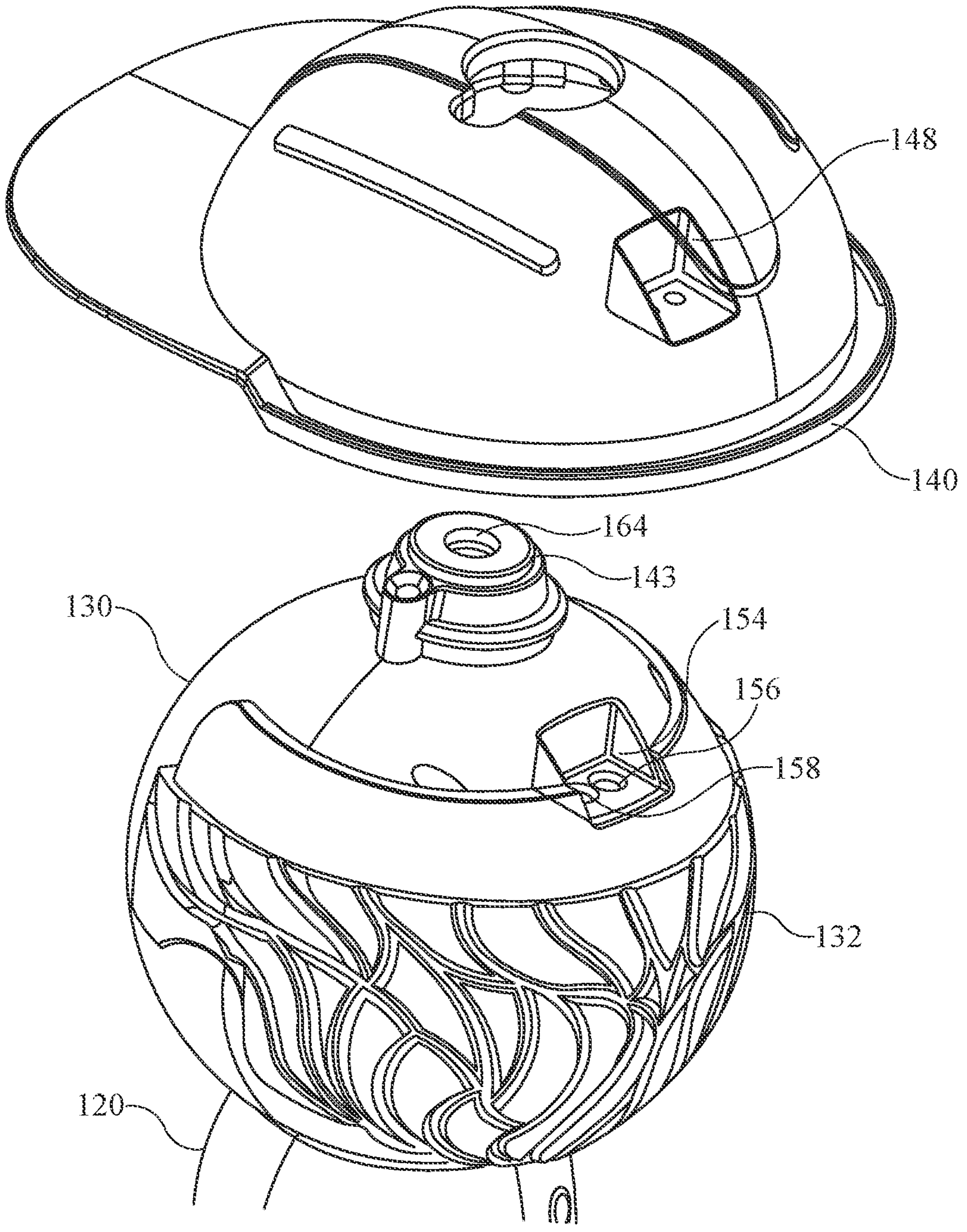
FIG. 15 is another top, perspective view of the hat removed from the housing of the bubble toy shown in FIG. 4, which shows a notch into which the hat secures.
Figure 16:
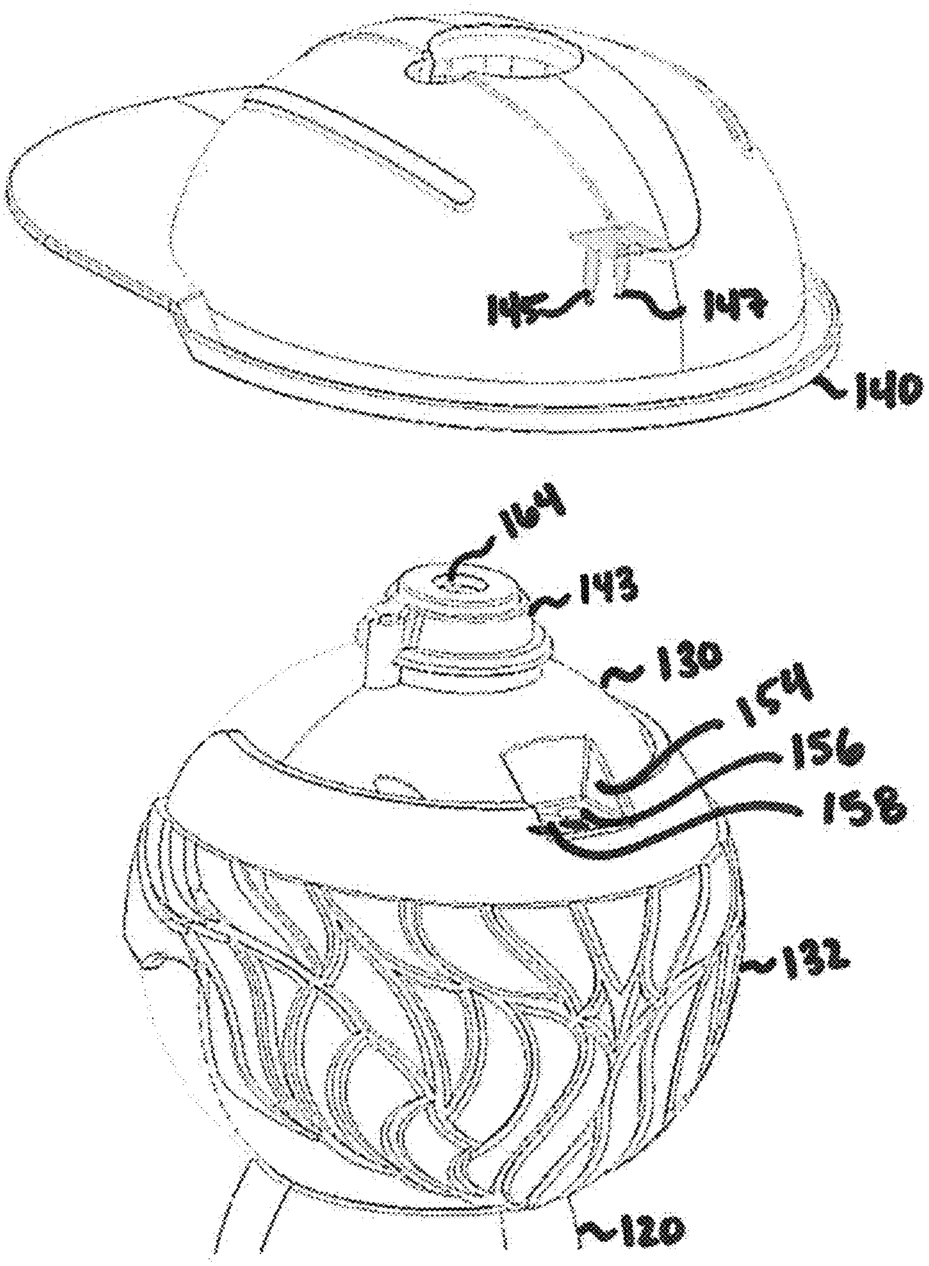
FIG. 16 a side, perspective view of the hat removed from the housing of the bubble toy shown in FIG. 4, wherein the hat includes resistors secured therein.
Figure 17:
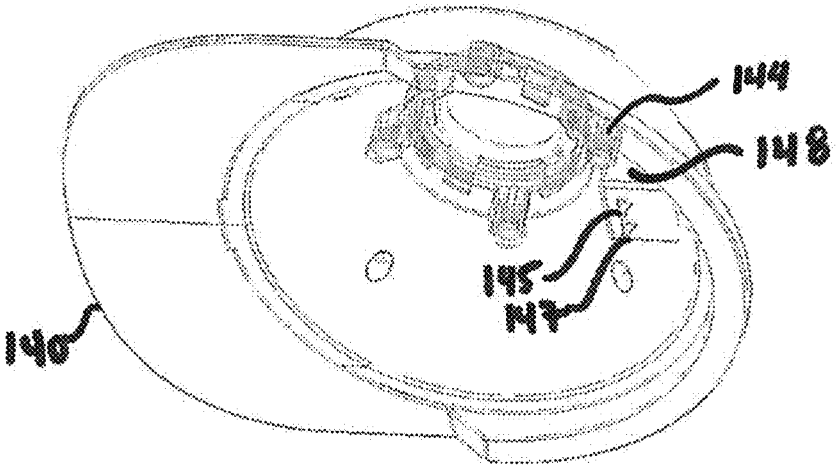
FIG. 17 is a bottom, perspective view of the hat removed from the housing of the bubble toy shown in FIG. 4, wherein the hat and housing are secured via a snap-fit mechanism.
Figure 17:
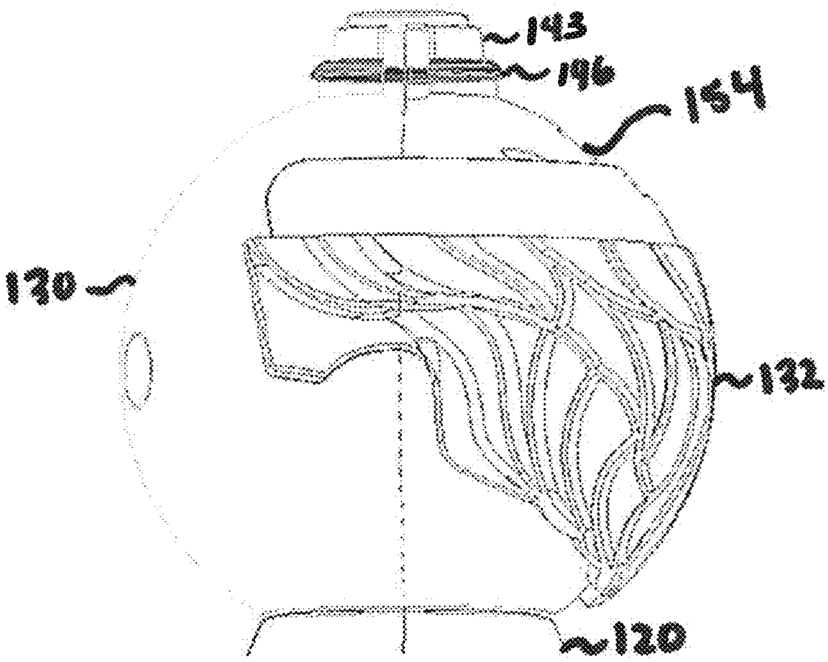
Figure 18:
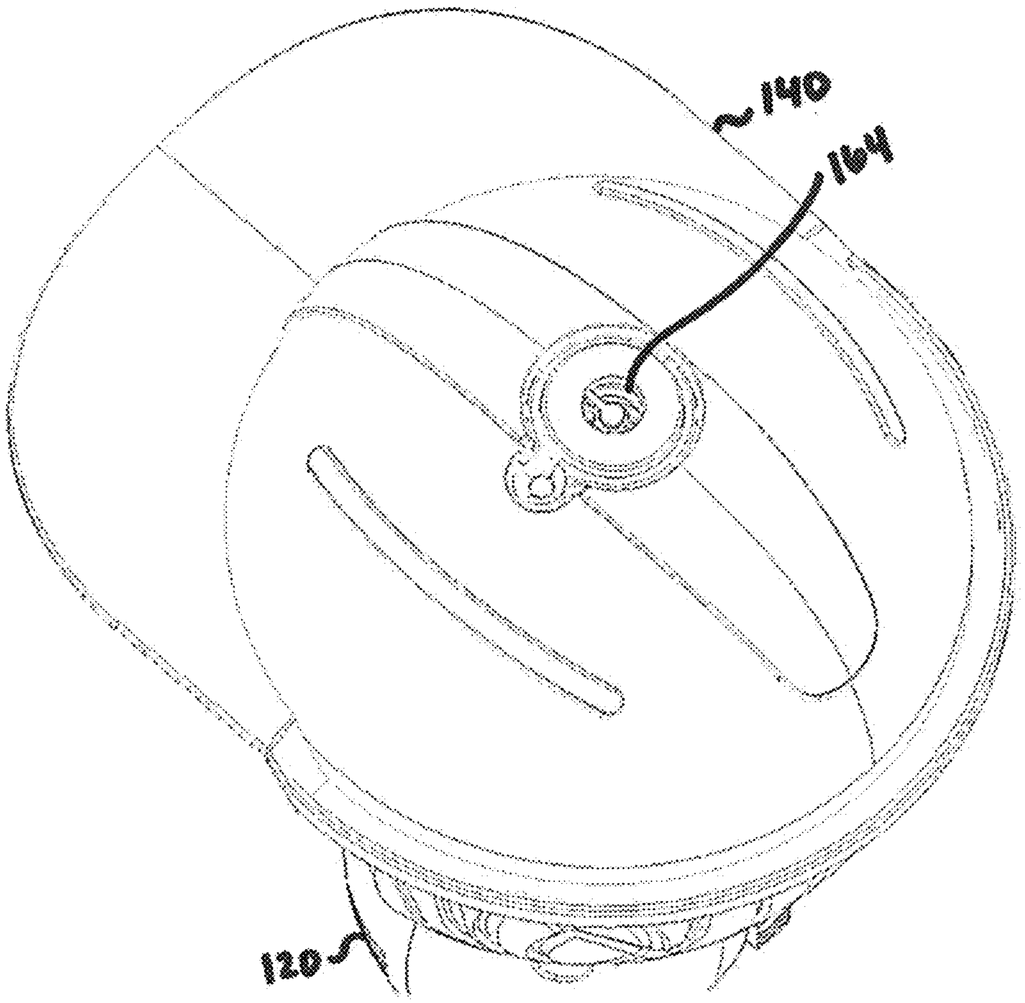
FIG. 18 is a top, view of the hat affixed to the housing of the toy shown in FIG. 4.

As shown in FIGS. 9, and 12-13, 15 and 17, a specifically designed key in shaped mount 148 is molded into an inside surface of the hat 140. Secured to the mount are two resistors (145, 147), such as pogo pins. As shown in FIGS. 8-9, 12, and 14-17 key in shaped mount aligns with a corresponding notch 154 in a top portion of the housing, which notch includes two slots (156, 158) into which the pogo pins insert. The alignment of the key in shape with the notch ensures that the hat is only connectable to the housing in one position, therefore always closing the circuit via the connection. As shown in FIGS. 9, and 12-13, the circuit is closed when the hat connects to the housing because the pogo pins connect to the microcontroller unit 150. This microcontroller is preprogrammed and imbedded before it is secured within the housing of the toy to recognize differing values of the resistors. When the resistors in the hat connect to the microcontroller unit, the unit detects and recognizes the specific resistance value. The unit then transmits a corresponding signal to the DF player 124 to play a sound that is associated with that specific resistance value. Further, the first 44 and second LEDs 46 of the illuminating animation device 10 are programmed via the PCB 42 and microcontroller to illuminate in synchronization with the sound emanated from the speaker 122. For example, the DF player is programmed with ten sounds, songs, and/or stories. Each hat includes resistors or pogo pins with different resistance values, for example, a firefighter hat has a resistance value of 4k ohms, a policeman hat is 1k ohms and a construction worker hat is 2k ohms. When a firefighter hat is connected to the housing, the microcontroller reads the resistance value and recognizes that the fireman hat has been connected. The microcontroller triggers the DF player to play a sound, song or story related to a fireman and the illuminating animation device illuminates in synchronization therewith. Accordingly, a fireman character comes to life within the toy 100 via the connection of a fireman hat. The features and elements of each modes described herein are not to be construed as limiting and can be programmed and activated in any combination.

The toy 100 is also capable of activation via a remote signal, such as through embedded instructions and or receipt of activation signals received by a receiver. This signal received is read and transmitted to various elements of the toy to activate illumination of LEDs (44, 46, 152), emit a sound through the speaker 122, activate the microphone 125 and/or produce bubbles. For example, the microcontroller unit 150 includes a proximity detection device, such as, for example RFID or other types of electronics, which sense location, proximity, or other wireless instructions to indicate and/or instruct illumination, sound and/or bubble production. Such proximity device, for example, include instructions and circuitry operable to detect location in respect to a transmitted beacon. For example, the toy automatically activates upon nearing a display, feature, fixture attraction or other location within an amusement park which is transmitting a unique beacon. When received by the toy, it illuminates and/or plays sound and/or activates in a predetermined manner. Upon receipt of a unique beacon signal, the toy is programmed by instructions stored in a memory to activate in a particular manner and/or play specific prerecorded or streamed audio signals, which are programmed with illumination of the first and second LEDs so that the mouth appears talking in synchronization with the song or sound playing. Alternatively, the device incorporates RFID detectors so, upon recognition of a specific RFID signal, the toy begins emitting a predetermined sequence of signals. Other implementations may be implemented such as GPS location detection and determination. Other automated instructions are further implemented such as emitting colors, playing predefined audio stored in memory of the toy or received by the receiver of the toy, playing signals which are streamed and received by the integrated receiver, and similar functionality.

Furthermore, a fixture may include an ultrasonic distance sensor that detects when a person is standing idle in front of it. When a user is detected, an electronic module is activated and broadcasts a signal or code within a specific proximity of the toy 100. This code unlocks an effect or feature of the toy, such as activating the illuminating animation device 10, producing bubbles, playing a sound, etc. Advantageously, the code that is sent is an unlocking code, which code unlocks an effect or feature that is already preprogrammed within the toy. The toys' microcontroller unit 150 is advantageously already programmed with this same first effect or feature. Accordingly, the fixture need only send a code to unlock this feature in the toy and does not need to send the entire programming for the feature. As such, a first feature is unlocked in the toy and is activated within the toy. As such, the toy sings the same song, tells the same story, illuminates in the same way, etc., as the first effect of the feature, such as a fireman. This first effect is then unlocked within the toy indefinitely and can be replayed by the user at any time and stored within a memory in the toy. This same interaction occurs when the user walks by a second, third, fourth, etc., fixture and these additional codes are sent to the toy to unlock these additional features, which can all be replayed by the user at any time.

Further, the toy 100 includes a transmitter, which transmits a signal from the toy to a fixture. For example, if the hat 140 connected to the housing 130 is a policeman hat, the microcontroller unit 150 detects and recognizes this via the resistance values of the resistor. A corresponding signal is sent via the transmitter to the fixture, which unlocks a policeman file stored within an integrated circuit in the fixture. The fixture plays a sound or song specific to a policeman, such as a police siren. Furthermore, the fixture may be animatronic and move according to the sound that is played to tell a story using animatronic arms.

In another embodiment, rather than the microcontroller unit being stored within the housing, it is stored within each unique hat or accessory. This is advantageous because it does not limit the number of prerecorded songs or stories in the microcontroller unit. Each hat is programmed with its own songs/sounds, so an unlimited number of hats are connectable to the toy. The toy is no longer limited by the preprogramming aspect of the microcontroller unit. The circuit would be closed in the same manner in that resistors would close the circuit, so the animation talking device would illuminate in synchronization with the sounds.

It is well recognized by persons skilled in the art that alternative embodiments to those disclosed herein, which are foreseeable alternatives, are also covered by this disclosure. The foregoing disclosure is not intended to be construed to limit the embodiments or otherwise to exclude such other embodiments, adaptations, variations, modifications and equivalent arrangements.

The invention claimed is:

1. An animated toy comprising:

a housing containing slots in a wall thereof and comprising a microcontroller unit secured adjacent to the slots and electrically connected to a speaker, and an illuminating animation device, wherein the device comprises:

an enclosure comprising a base and a film secured together via a wall, thereby forming a compartment;

a divider secured within the compartment, which divides the compartment into a first and second chamber; and a printed circuit board secured to the base and electrically connected to the microcontroller unit, wherein the circuit board comprises a first and second LED, wherein the first LED is secured within the first chamber and the second LED is secured within the second chamber; and a hat comprising resistors mounted to an inside surface thereof, wherein the resistors secure within the slots thereby connecting to the microcontroller unit and activating the speaker in synchronization with illumination of the second LED.

2. The animated toy of claim 1, wherein a smiley face is cut into the film, and the divider is curved to correspond with the u-shape of the mouth so that the eyes and an upper portion of the mouth are illuminated by the first LED and a lower portion of the mouth are illuminated by the second LED.

3. The animated toy of claim 2, wherein the housing comprises a silhouette of a face etched into an outside surface thereof and adjacent to the smiley face.

4. The animated toy of claim 1, wherein the housing further comprises a DF player electrically connected to the speaker.

5. The animated toy of claim 4, wherein the DF player is programmed with at least one sound which is associated with at least one resistance value of the resistors.

6. The animated toy of claim 5, wherein the microcontroller unit is configured to recognize the at least one resistance value when the resistor is secured within the slots to automatically activate the corresponding at least one sound.

7. The animated toy of claim 1, wherein the housing is made of a material with an opacity of 50-80% opacity.

8. The animated toy of claim 1, wherein the housing further comprises a microphone electrically connected to the microcontroller unit, wherein the illumination of the second LED is sound activated in synchronization with sound detected by the microphone.

9. The animated toy of claim 1, wherein the housing includes a slide switch electrically connected to the microcontroller unit and a power source secured within the housing.

10. An animated bubble toy comprising:

a handle;

a housing connected to the handle and containing slots in a wall thereof and comprising a microcontroller unit secured adjacent to the slots and electrically connected to a speaker, and an illuminating animation device, wherein the device comprises:

an enclosure comprising a base and a film secured together via a wall, thereby forming a compartment;

a divider secured within the compartment, which divides the compartment into a first and second chamber; and a printed circuit board secured to the base and electrically connected to the microcontroller unit, wherein the circuit board comprises a first and second LED, wherein the first LED is secured within the first chamber and the second LED is secured within the second chamber, wherein a smiley face is cut into the film, and the divider is curved to correspond with the u-shape of the mouth so that the eyes and an upper portion of the mouth are illuminated by the first LED and a lower portion of the mouth are illuminated by the second LED; and a hat comprising resistors mounted to an inside surface thereof, wherein the resistors secure within the slots thereby connecting to the microcontroller unit and activating the speaker in synchronization with illumination of the second LED.

11. The animated bubble toy of claim 10, wherein the housing further comprises a DF player electrically connected to the speaker.

12. The animated bubble toy of claim 11, wherein the wherein the microcontroller unit recognizes the resistance values of the resistor, which activates a sound stored within the DF player to play through the speaker and the first and second LED illuminate in synchronization with the sound.

13. The animated bubble toy of claim 10, wherein the housing further comprises a microphone electrically connected to the microcontroller unit, wherein the illumination of the second LED is sound activated in synchronization with sound detected by the microphone.

14. The animated bubble toy of claim 10, wherein the housing is made of a material with an opacity of 50-80% opacity.

* * * * *